May 2, 1939.　　　　O. F. LEWIS　　　　2,156,733
MINING MACHINE
Filed March 7, 1938　　　3 Sheets-Sheet 1
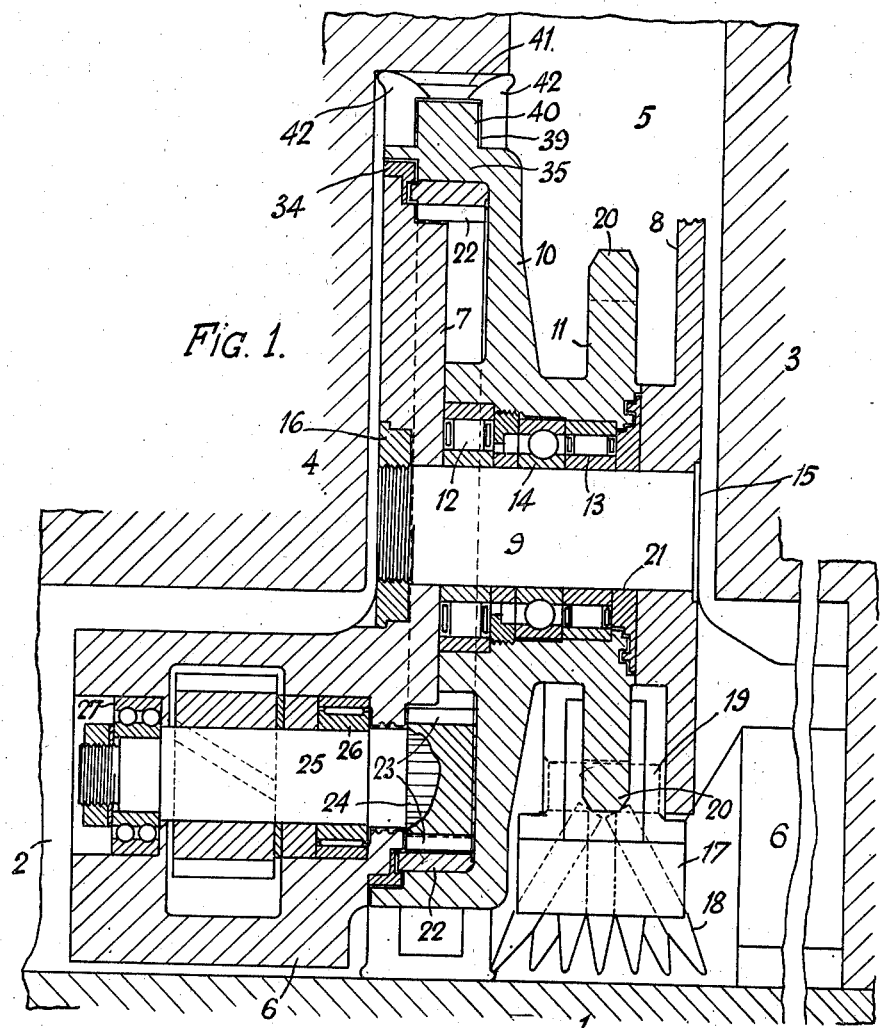
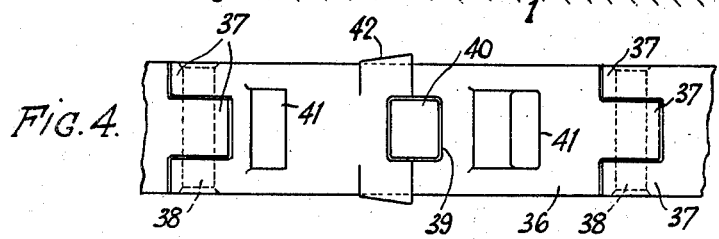
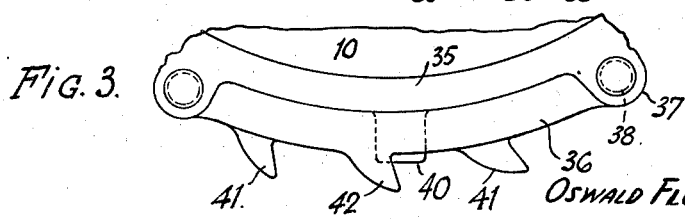
OSWALD FLOYD LEWIS
INVENTOR
Myron B. Stevens
HIS ATTORNEY May 2, 1939.  O. F. LEWIS  2,156,733
MINING MACHINE
Filed March 7, 1938   3 Sheets-Sheet 2

Oswald Floyd Lewis INVENTOR
Myron B. Stevens
HIS ATTORNEY

May 2, 1939.                    O. F. LEWIS                    2,156,733
                               MINING MACHINE
                  Filed March 7, 1938          3 Sheets-Sheet 3
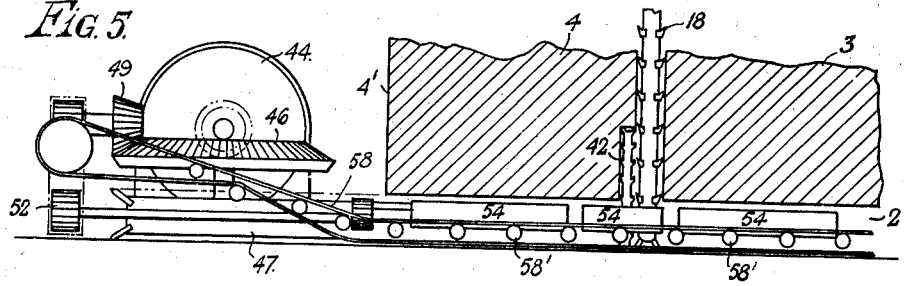
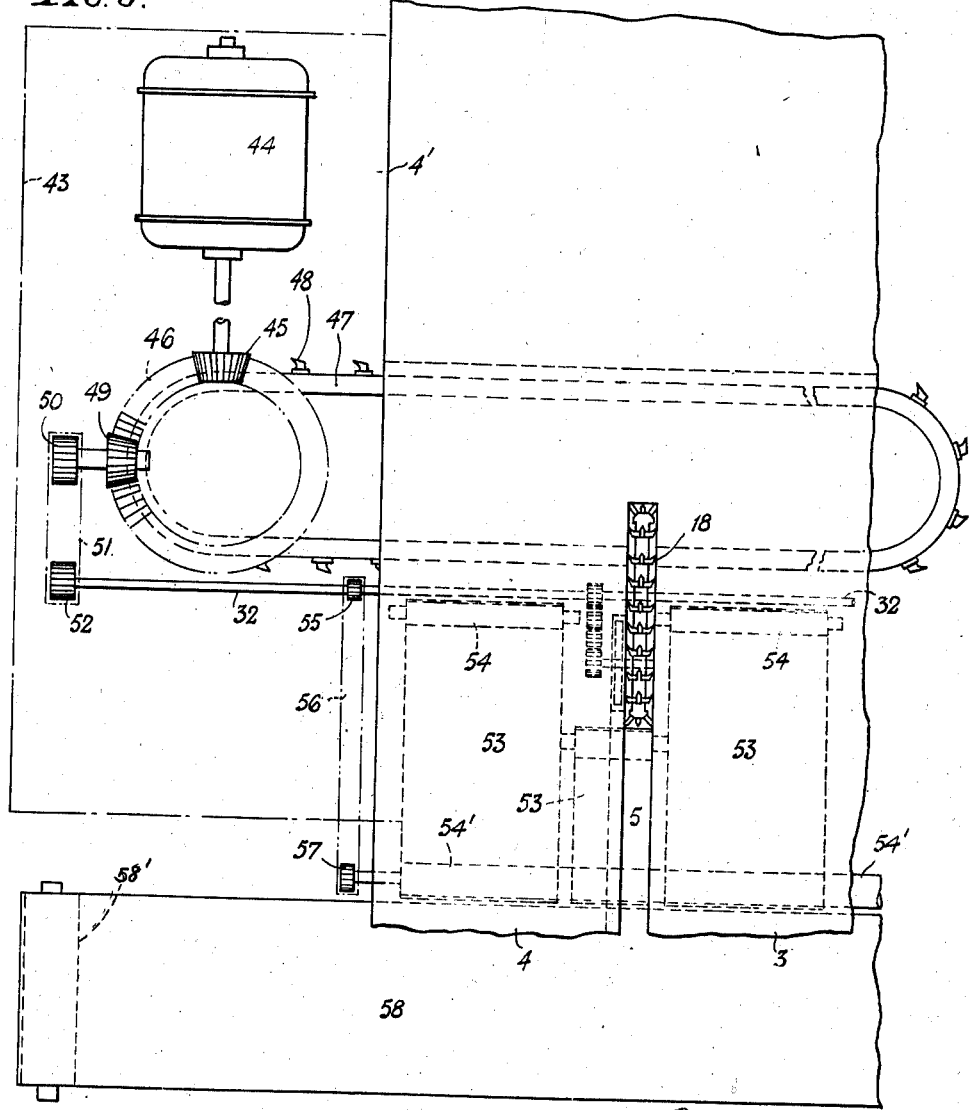
OSWALD FLOYD LEWIS
INVENTOR
Myron B. Stevens
ATTORNEY Patented May 2, 1939

2,156,733

UNITED STATES PATENT OFFICE 2,156,733

MINING MACHINE

Oswald Floyd Lewis, near Sheffield, England, assignor of one-half to Newton, Chambers & Company Limited, near Sheffield, England, a corporation of Great Britain Application March 7, 1938, Serial No. 194,456
In Great Britain June 24, 1937

4 Claims. (Cl. 262—28)

This invention relates to coal-cutting and like machines or combined cutting and loading machines.

The object of the invention is to provide an improved coal-cutting or like machine which is capable of more extensive cutting operations and of cutting up the coal or other mineral in a more convenient and expeditious manner than the usual constructions of coal-cutting machines.

The present invention consists in an improved shearing unit, for a coal-cutting or like machine, having an endless cutter chain running in a vertical plane. The unit is drawn along in the undercut made by the usual cutter chain on a horizontal jib and in order to enable a satisfactory drive to be transmitted through the space of the undercut, the gear head which drives the chain consists of an internally toothed gear driven by a pinion and the gear is provided with cutters projecting at its periphery to cut the clearance for the gear head as the unit is drawn along. The pinion can be made sufficiently compact to enable it to be coupled to a drive shaft extending into the undercut and of sufficient diameter to transmit the necessary power. The gear head is mounted on a suitable base member and the moving parts are protected against the entry of dust or chips by suitable sealing rings.

Other features of the invention will be clear from the example illustrated in the accompanying drawings in which:

Fig. 1 is an elevation, partly in section, of the lower end of the vertical shearing unit, including the gear head, in the position it occupies when shearing the coal.

Figs. 3 and 4 are detail views of the cutters on the gear head.

Figure 5 is a diagrammatic elevation, partly in vertical section, showing the device of the invention combined with a conventional form of coal cutting machine.

Figure 6 is a plan view of Figure 5.

Figure 2:
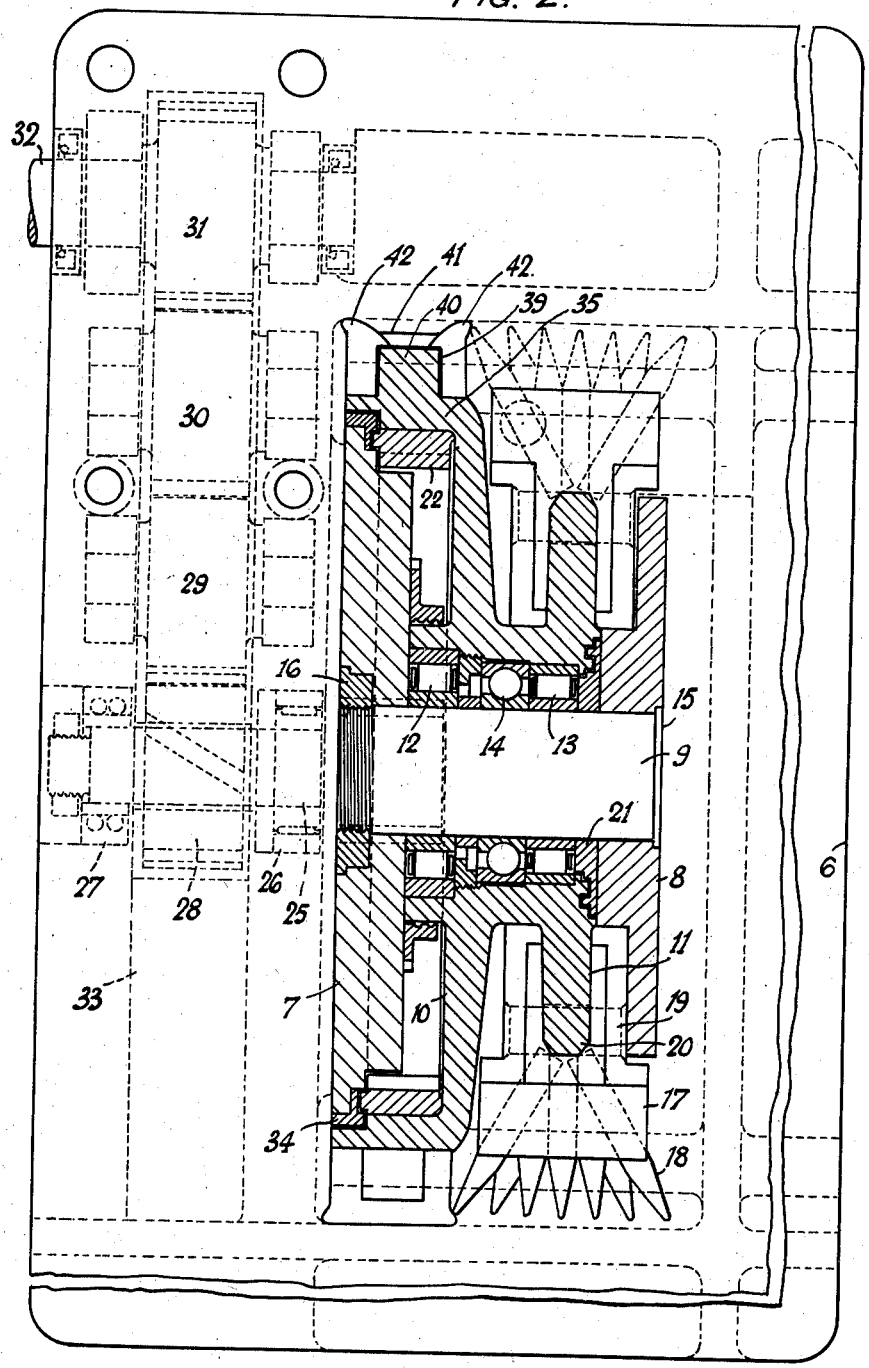
Fig. 2 is a plan view, partly in vertical section, of the lower end of the unit.

Referring first to Figs. 5 and 6, the machine with which is used the shearing attachment comprising the invention, is conventionally shown. The driving motor or gearing are contained in a body or casing indicated by the chain-dotted outline 43, and within this body is a driving motor 44 driving a bevel pinion 45 which meshes with a larger bevel pinion 46 which drives the usual horizontal kerf cutting jib 47 having an endless cutting chain provided with cutting picks indicated at 48. These picks 48 travel around the jib 47 and make the usual horizontal undercut or kerf under the coal to be mined. The undercut is indicated at 2 and the body of coal above it is indicated by the reference numerals 3 and 4. The existing face of the coal is indicated by 4'.

The larger bevel gear 46 also drives a second bevel pinion 49 which is secured on the shaft of a spur wheel 50 which is coupled, through a driving chain indicated at 51, to a gear 52 which is secured on a shaft 32 which drives the conveyors and the vertical shearing attachment. The conveyors are indicated at 53 and consist of endless belt conveyors carried in the usual manner on suitable rollers 54 and 54' at their ends. The drive from the conveyors is through a gear wheel 55 on the shaft 32 and through a driving chain 56 to a gear 57 on the shaft of the roller 54' which is common to all of the conveyors 53. In this way the conveyors 53 can all be driven from the same drive, since the common drive roller 54' is clear of the vertical shearing attachment. The shorter supporting rollers 54 at the other ends of the conveyors 53 are free running. The coal falling on the conveyors 53 is delivered by them to a transversely running end conveyor 58 which is of the usual endless belt type and which is driven by any suitable means (not shown). This end conveyor 58 has the usual supporting rollers 58' and these are so positioned and arranged that the conveyor 58 can extend into the undercut 2 as indicated in Fig. 6 and Fig. 5. The end conveyor 58 delivers the coal onto the usual long wall conveyor (not shown). The shaft 32 can be extended, as indicated, to drive an additional vertical shearing attachment located on the right of Fig. 6 but not shown therein.

As the main body 43 of the coal cutting machine is drawn or driven, in any well known manner (not shown), parallel to the coal face 4', the horizontal cutting chain on the jib 47 cuts a horizontal kerf 2 at floor level as indicated in Fig. 5. The vertical shearing attachment and the conveyors travel with the jib 47 but behind it and the shearing attachment is driven so that its cutters 18 make the shearing cut indicated at 5 and the driving gear thereof, which is provided with cutting teeth 42, as will be described in detail later, cuts its own clearance through the coal body 4, as indicated on the left of the shearing cutters in Fig. 5.

Referring now to Fig. 1, the coal or other mineral which is being mined is indicated by the shading around the shearing unit; the floor is indicated at 1, the undercut (generally about 6") previously made by the usual horizontal cutter chain is indicated at 2, while 3 and 4 represent the body of coal at the end of the undercut and above the undercut, 5 indicates the vertical shearing cut made by the shearing unit.

The shearing unit consists of a base member 6 which is formed with two upstanding portions 7 and 8 which carry a pin 9 forming a support for an internally toothed gear 10 made integral with a sprocket or chain wheel 11. The gear 10 and sprocket 11 constitute a driving head which rotates on the roller bearings 12, 13 surrounding the pin 9 and between these roller bearings is a ball thrust bearing 14. The pin 9 is held in the members 7 and 8 by the head 15 on one end of the pin and a nut 16 which screws on to its other end.

The projecting portion 8 of the base 6 extends upwards to form a jib support bar and carries and guides an endless cutter chain, running in a vertical plane, which runs over an idler sprocket or curved guide (not shown) at the top end of the extended member 8, and at its lower end the chain is driven by the sprocket 11. This cutter chain is formed in the usual way from pick-carrying blocks, one of which is shown at 17 with its picks 18, and joined by links coupled to the pick blocks by pins as indicated at 19 and the chain so formed is engaged by the teeth 20 of the sprocket and is guided as it leaves the sprocket by the jib support formed by the extension of the part 8. Between the sprocket 11 and the part 8 is fitted a dust-excluding packing 21 having a labyrinthine surface. The picks 18 of the cutter chain are held in the pick blocks 17 in any suitable manner, e. g., by clamping studs, and are set to cut the vertical shear indicated at 5.

The toothed gear 10 is provided with an internal ring of teeth 22 with which meshes the teeth 23 of a pinion or spur wheel 24 secured on the end of a short shaft 25 running in bearings 26 and 27 in the base member 6. The shaft 25 also has secured on it a helically toothed gear wheel 28 which is driven, through the intermediate idler gears 29, 30 from a gear 31 secured on a driving shaft 32 (Figs. 2 and 6). It will be seen from Fig. 2 that by adopting this arrangement the shaft 32 is brought clear of the gear head for the shearing unit and can therefore be a continuous shaft driving several units if desired. The gears 28 to 31 run in the clearance space 33 in the base member 6 and the gears 29, 30 and 31 are supported in bearings in the base 6. By driving the gear wheel 10 from a spur wheel engaging internal teeth on the gear 10 as above described it is possible to obtain a satisfactory and efficient drive capable of transmitting the necessary power, despite the small space (usually not more than 6" high) available in the undercut.

A dust-excluding packing ring 34 is arranged between the part 7 and the adjacent face of the gear 10.

To enable the gear head of the unit to cut its own clearance in the coal as the unit is drawn through the coal, the gear 10 is provided on its periphery with cutters which are preferably made separately from the gear 10 and secured thereon as shown more particularly in Figs. 3 and 4. Around the periphery of the flange 35 of the gear 10 is fixed a cutter ring formed of a plurality of curved blocks 36 conforming with the curvature of the flange 35 and linked at their ends by interengaging couplings 37 secured by traverse rivets or pins 38 to form a complete circular ring. Each block has in it a square or rectangular hole or socket 39 which fits over a square or rectangular projection 40 integral with the flange 35 and the blocks 36 are thus practically solid with the gear 10. Each of the blocks 36 has projecting from it two cutting teeth 41, situated on the centre line of the block, and a pair of cutting teeth 42 midway between the teeth 41 and one on each side of the centre line and projecting slightly beyond the edges of the block to ensure that sufficient clearance is cut beyond the faces of the gear 10 and member 7 as shown in Fig. 1. The teeth 41 are made wider than the gap between the pair of teeth 42.

The shearing unit may be driven directly by any suitable motor, e. g., electric or compressed air driven, or, as shown, the shaft 32 may be coupled to the drive for the horizontal jib cutter chain which undercuts the coal, a suitable clutch or other means (not shown) of connecting and disconnecting the drive to shaft 32 may be provided.

The vertical shearing unit may form part of any suitable coal-cutting or like machine and is drawn or driven through the coal or other mineral behind the cutting machine as it makes the undercut and the vertically running chain of the unit makes a vertical shearing cut through the coal seam and the teeth 41 and 42 on the outside of the gear head 10 cut a clearance for the passage of this gear head through the seam as will be clear from Fig. 1.

It will be understood, of course, that some of the constructional features of the arrangement illustrated have not been shown in detail and the mechanical or constructional details may be modified to meet particular conditions. For example, the part 8 may be bolted to the base 6 for convenience in manufacture, and where one unit only is used the drive can be direct to the shaft 25.

In the arrangement according to the invention the construction is such that the shearing unit can be properly and adequately driven despite the small space available in the undercut for the power transmission mechanism since the unit provides a compact and easily manipulated device.

What I claim as my invention and desire to secure by Letters Patent is:

1. In a coal-cutting or like machine having a cutter chain and driving means therefor, a sprocket engaging and driving said chain, a gear driving said sprocket, and cutters projecting at the periphery of said gear to cut a clearance for said gear in the mineral being mined.

2. In a coal-cutting or like machine having a cutter chain and driving means therefor, a sprocket engaging and driving said chain, a gear driving said sprocket, and cutters projecting at the periphery of said gear to cut a clearance for said gear in the mineral being mined, said cutters consisting of toothed curved blocks secured around the periphery of the gear.

3. In a coal cutting or like machine having a cutter chain running in a vertical plane, means for driving said chain comprising mechanism transmitting power through an undercut previously made, a pinion driven by said mechanism, an internally toothed gear with which said pinion meshes, a chain-driving sprocket integral with said gear, and cutters projecting at the periphery of said gear to cut a clearance for the passage of the gear through the mineral being mined.

4. In a chain coal-cutting or like machine, a base member, supports projecting from said base, an axle carried by said supports, an internally toothed gear having an integral chain sprocket rotatable on said axle, power transmission mechanism within said base member, means for driving said gear from said mechanism, and cutters projecting from the periphery of said gear.

OSWALD FLOYD LEWIS.